UNITED STATES PATENT OFFICE 2,179,706

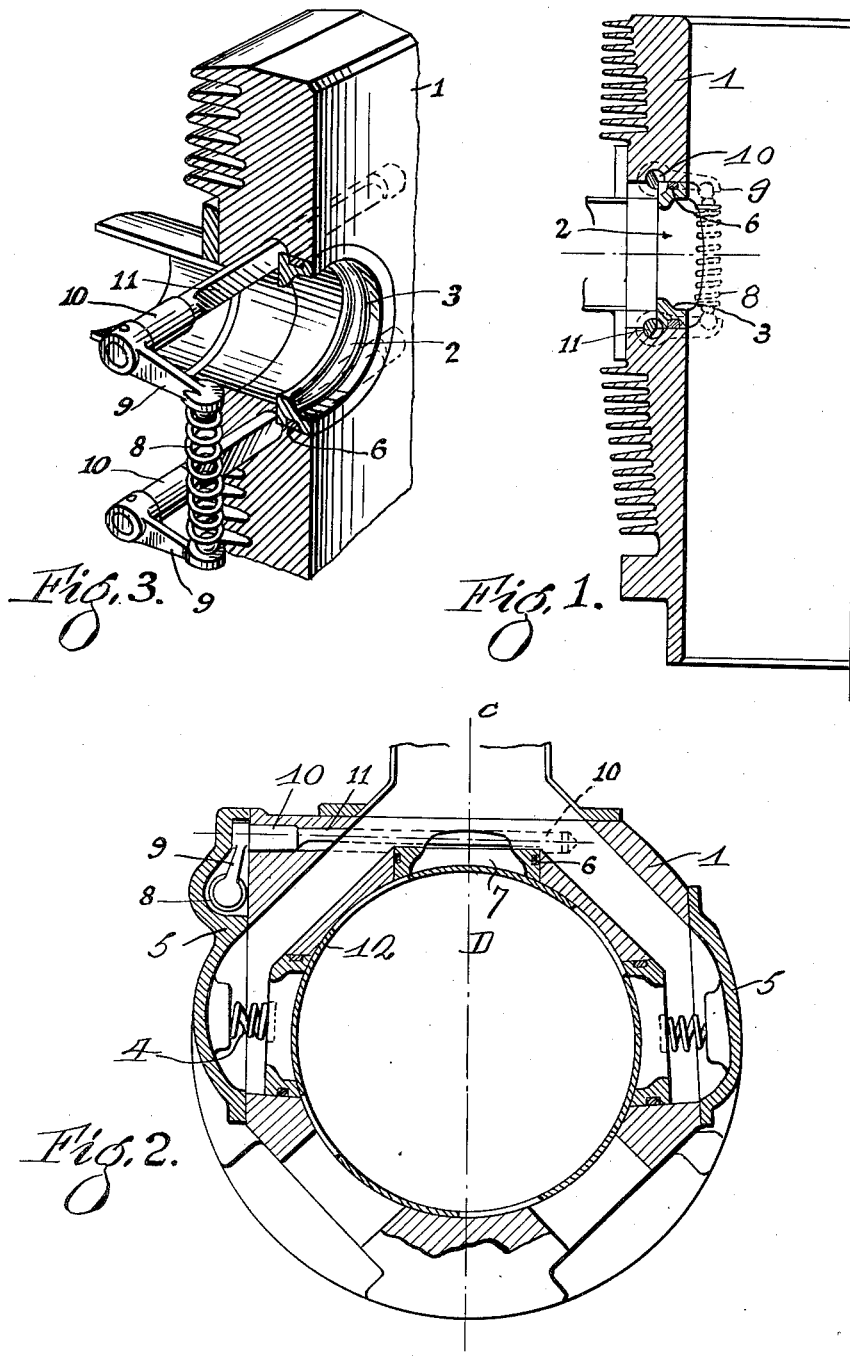

SLEEVE VALVE ENGINE

Marius Jean-Baptiste Barbarou, Neuilly, Seine, France

Application December 28, 1937, Serial No. 182,123
In France December 31, 1936

2 Claims. (Cl. 123—75)

This invention relates to improvements in the internal combustion engines, in which a ported sleeve is interposed between a ported cylinder and the combustion chamber, and the sleeve is moved relatively to the cylinder to effect the desired opening and closing of the ports.

An object of the invention is to ensure a good seal between the sleeve and the ported parts of the cylinder, as otherwise efficiency is lost due to leakage of fuel between the sleeve and cylinder.

A further object of the invention is to provide ports in the cylinder located in members loose in the cylinder and pressed inwardly radially against the periphery of the ported valves.

In its preferred form the device is constructed of a number of suitably shaped hollow plugs being fitted slidably in correspondingly shaped radially directed holes in the cylinder, and spring means pressing the inner ends of said plugs radially against the outer surface of the sleeve, the inner ends of said plugs being radiused to correspond with the circumference of the sleeve, said plugs forming termini of passages in the cylinder and leading to a suitable source, e. g. the source of supply of combustible mixture.

The other objects and advantages of the invention are set forth fully in the description, and the novel features are defined in the appended claims. But the disclosure is of course to be taken as explanatory only and changes in shape, size, arrangement of parts and mode of operation may be made without departing from the principle of the invention.

On the drawing,

Fig. 1 is a sectional elevation on line C—D of Fig. 2 showing indirect application of spring pressure to ported members pressed against the ported sleeve, Fig. 2 is a sectional plan view showing a suitable arrangement of ports embodying the above indirect form of ported member, and Fig. 3 is an enlarged perspective view of a portion of Fig. 1.

Referring to the drawing the cylinder 1 is shown in Figs. 1 and 2 with an inlet port 2 which is formed in an annular plug 3 fitted as a close sliding fit in a circular hole in the cylinder wall. Coiled compression springs 4 interposed between the plug 3 and a cap 5 fixed to the cylinder press the plug 3 radially inwards so that its inner end is pressed against the periphery of the ported sleeve 12 forming the wall of the combustion chamber. A sealing ring 6, acting similarly to a piston ring, preferably encircles the plug 3 to ensure a tight seal in the cylinder. The inner end of the plug 3 is carefully radiused so that the whole of its inner annular end wall bears against the ported sleeve 12.

The foregoing construction is suitable where a member such as the cap 5 can be fitted against the cylinder wall, but in any case the construction shown in Figs. 1 and 3 constitutes the main characteristic of the invention. To apply the desired pressure to the ported plug under certain special circumstances wherein the cap-springs 5 and 4 are not applicable, a pair of transverse spindles 10 are located so as to intersect diametrically opposed parts of the appropriate annular plug 3 and are supported in suitable bores in the cylinder. At one end the spindles are provided with cranked levers 9 between which is interposed a coiled compression spring 8 tending to force said levers apart and thus rotate the spindles. Cams 11 are formed on these spindles opposite to the plug by the simple expedient of milling a flat thereon, whereby these cams under the action of the spring 8 press the ported plug inwards against the sleeve 12.

As will be seen from Figure 2, the arrangement of the ported member is such that a sealing action is had between the cylinder and sleeve and also between sleeve and ported member. Since the sleeve has a working clearance in the cylinder, it is therefore pressed thereagainst by the ported member, at the diametrally opposed point devoid of ports; while the tension of said member against the sleeve assures a tight joint between sleeve and member.

What I claim is:

1. Means for effecting a seal between a ported part of a cylinder and the ported sleeve of a sleeve valve internal combustion engine wherein the said annular member is engaged at annular ends remote from the sleeve valve engaging ends by cams acted upon by compression springs fitted in the cylinder assembly.

2. In an internal combustion engine having a ported cylinder and a ported sleeve valve, means for effecting a seal between said cylinder port and sleeve comprising an annular member slidable longitudinally in the cylinder port, cams engaging diametrally opposite portions of said member, and a spring for actuating said cams in order to urge the member towards the sleeve.

MARIUS JEAN-BAPTISTE BARBAROU.